(12) United States Patent
Zens et al.

(10) Patent No.: US 12,553,505 B2
(45) Date of Patent: Feb. 17, 2026

(54) GEARBOX

(71) Applicant: Harmonic Drive SE, Limburg (DE)

(72) Inventors: Frank Zens, Diez (DE); Simon Luckert, Limburg (DE)

(73) Assignee: Harmonic Drive SE, Limburg (DE)

( * ) Notice: Subject to any disclaimer, the term of this patent is extended or adjusted under 35 U.S.C. 154(b) by 0 days.

(21) Appl. No.: 18/682,974

(22) PCT Filed: Sep. 15, 2023

(86) PCT No.: PCT/EP2023/075415
§ 371 (c)(1),
(2) Date: Feb. 12, 2024

(87) PCT Pub. No.: WO2024/149477
PCT Pub. Date: Jul. 18, 2024

(65) Prior Publication Data
US 2025/0137519 A1    May 1, 2025

(30) Foreign Application Priority Data

Jan. 11, 2023  (DE) ...................... 10 2023 100 528.6

(51) Int. Cl.
    *F16H 49/00*     (2006.01)
    *F16H 57/02*     (2012.01)
    *F16H 57/021*    (2012.01)

(52) U.S. Cl.
    CPC ......... *F16H 49/001* (2013.01); *F16H 57/021* (2013.01); *F16H 2049/003* (2013.01); *F16H 2057/02073* (2013.01)

(58) Field of Classification Search
    CPC ................. F16H 49/001; F16H 57/021; F16H 2049/003; F16H 2057/02073
    See application file for complete search history.

(56) References Cited

U.S. PATENT DOCUMENTS

| | | |
|---|---|---|
| 1,035,463 A | 8/1912 | Oldfield |
| 6,019,518 A | 2/2000 | Yoon |
| 6,026,711 A * | 2/2000 | Tortora ................. F16H 49/001 384/512 |
| 6,050,155 A | 4/2000 | Tortora |

(Continued)

FOREIGN PATENT DOCUMENTS

| | | |
|---|---|---|
| DE | 8426143 U1 | 4/1985 |
| DE | 19938057 A1 | 2/2000 |

(Continued)

*Primary Examiner* — Terence Boes
(74) *Attorney, Agent, or Firm* — Rogowski Law LLC

(57) ABSTRACT

A gearbox (70) has a pivot bearing (50) with an outer pivot bearing ring (1a) and an inner pivot bearing ring (1b). A filling groove (18) for rolling elements (16) is formed between the outer and inner pivot bearing rings. A tension shaft gear (40) with a central longitudinal axis (15) is mounted in the pivot bearing (50) and has a wave generator (10). An elastic flexspline (4) with an external gearing (3) and a circular spline (6) has an internal gearing (5). The flexspline (4) can be elliptically deformed by the wave generator (10) so that the external gearing (3) of the flexspline (4) engages with the internal gearing (5) of the circular spline (6) in opposite regions of a large elliptical axis. The circular spline (6) has a securing element (20) which blocks axial movement of the rolling elements (16).

11 Claims, 10 Drawing Sheets

(56) References Cited

U.S. PATENT DOCUMENTS

| | | |
|---|---|---|
| 6,269,711 B1 | 8/2001 | Tejima |
| 10,876,614 B2 | 12/2020 | Mendel |
| 12,215,767 B2 | 2/2025 | Mendel |
| 2023/0130289 A1 | 4/2023 | Mendel |

FOREIGN PATENT DOCUMENTS

| | | | |
|---|---|---|---|
| DE | 102015104308 A1 | 9/2016 | |
| DE | 102019100586 A1 | 8/2019 | |
| DE | 102020109646 A1 | 10/2021 | |
| JP | 2001304352 A | 10/2001 | |
| JP | 2018511765 A | 4/2018 | |
| WO | 2018157910 A1 | 9/2018 | |
| WO | WO-2021204624 A1 * | 10/2021 | ........... F16H 49/001 |

* cited by examiner

GEARBOX

CROSS-REFERENCE TO RELATED APPLICATIONS

This application is a national stage application (under 35 USC § 371) of PCT/EP2023/075415, filed Sep. 15, 2023, which claims benefit of DE 10202023100528, filed Jan. 11, 2023, the contents of each of which is incorporated by reference herein.

BACKGROUND OF THE INVENTION

Technical Field and State of the Art

A pivot bearing and the tension shaft gearbox mounted in it form a gearbox. Such gearboxes are used in a variety of ways in many areas of technology. In particular, such gearboxes are increasingly being used in robotics and also in prosthetics.

A tension shaft gearbox consists of three components arranged coaxially to one another: the wave generator assembly, which has an elliptical cross-section, the rigid internally toothed ring gear circular spline, and the thin-walled bushing-shaped externally toothed gear component flexspline. The wave generator deforms the toothed area of the flexspline via a ball bearing so that the external gearing of the flexspline is in mesh with the internal gearing of the circular spline on both sides of the large elliptical axis.

When the wave generator is rotated, the large elliptical axis and thus the tooth mesh range shifts in the circumferential direction. As the flexspline of the gearbox usually has two fewer teeth than the circular spline, the flexspline rotates by an angle of one tooth pitch relative to the circular spline during half a revolution of the wave generator and by an angle of two tooth pitches during a full revolution. When the circular spline is fixed, the flexspline rotates in the opposite direction to the wave generator as the output element. The circular spline can be fixed in a pivot bearing ring.

To realize a rotary movement, the externally toothed gear component or flexspline and the ring gear or circular spline of the tension shaft gearbox are each connected to a ring of the pivot bearing.

It is known from DE 10 2015 104 308 A1 that a pivot bearing is designed in such a way that the ring gear or the transmission component and the pivot bearing ring are each provided with at least one receptacle through which rolling elements can be introduced into a pivot bearing between the pivot bearing surface of the wheel or the transmission component and the pivot bearing surface of the pivot bearing ring in a corresponding position of the two receptacles relative to one another.

In the disclosure document DE 10 2020 109 646 A1, a pivot bearing with an inner and an outer pivot bearing ring is disclosed, in which a roller bearing with receptacles for the rolling elements is arranged between a pivot bearing surface of the inner pivot bearing ring and a pivot bearing surface of the outer pivot bearing ring, wherein a guide ring for the rolling elements is arranged in at least one receptacle between the receptacle opening and the rolling elements of the roller bearing.

The disadvantage of the known solutions is that an additional component must be used to secure the rolling elements axially, which increases the number of components, manufacturing costs, wear, and susceptibility to faults.

It is therefore an objective of the invention to improve a gearbox described above in such a way that the disadvantages of the prior art are overcome.

This objective is solved in accordance with the invention in that the circular spline or the ring gear has a securing element which blocks axial movement of the rolling elements.

Advantageous embodiments of the invention are the subject matter of the dependent claims.

SUMMARY OF THE INVENTION

The invention is based on the consideration that it is essential to prevent the rolling elements from falling out of the pivot bearing. Replacing the pivot bearing is very time-consuming, especially in installation situations that are difficult to access. In addition, malfunctions and blocking of the bearing in operating condition can lead to dangerous situations. The use of a separate component as a guide ring to axially restrict the rolling elements increases the mounting effort of the pivot bearing.

As has now been recognized, the rolling elements can be prevented from falling out without an additional component by integrating the securing element into an existing component that is adjacent to the filling groove for the rolling elements. As the circular spline can be arranged adjacent to the filling groove, the securing element can be integrated with the circular spline so that no additional component is required. The securing element is therefore integrated with the circular spline or ring gear, which means that both parts are made in one piece or from one material.

The securing element thus acts as a kind of securing lug. The circular spline or ring gear therefore fulfills a dual function by preventing the rolling elements from falling out in addition to its gear function.

The components of the gearbox, namely the two pivot bearing rings, the wave generator assembly, the flexspline, or the externally toothed gear component and the circular spline or the ring gear are arranged coaxially to a central longitudinal axis of the tension shaft gearbox or the gearbox.

In a preferred embodiment, the securing element is formed around the full circumference of the ring gear, in particular rotationally symmetrical. This has the advantage that the rolling elements are secured in every rotational position of the wheel, which simplifies the assembly of the gearbox. At the same time, centering is made possible so that the rotationally symmetrical securing element performs a dual function.

In an alternative preferred embodiment, the securing element is designed in such a way that it only occupies a finite angle on the circumferential side. This design is based on the consideration that the rolling elements only need to be secured in the area of the filling groove. The size of the angle depends on the size of the rolling elements and must be selected in such a way that falling out or jamming is prevented. This is preferably in the range of 5° and 15°. In this way, weight can be saved in the production of the wheel.

The securing element advantageously has a contact surface for the rolling elements that is perpendicular to the central longitudinal axis of the tension shaft gearbox. The contact surface is preferably designed as a flat surface. Alternatively, the contact surface can be convex or concave.

The securing element preferably has an expansion in the radial direction (perpendicular to the central longitudinal axis of the tension shaft gearbox) that is between 4% and 10%, in particular 7%, of the radius of the rolling elements.

Preferably, the securing element restricts the axial movement of the rolling elements to less than 10% of the radius of the rolling elements.

In a preferred embodiment, the securing element is designed as an axial collar. The axial collar preferably protrudes axially, i.e., in a direction parallel to the central longitudinal axis of the gearbox, into the filling groove.

In a further preferred embodiment, the securing element is designed as an axial projection whose cross-sectional area is formed by two circular arcs. The inner arc has a larger radius, its center lies on the component axis. The center of the outer arc with the smaller radius lies on or near the inner arc. The axis of the projection can run parallel to the central longitudinal axis of the gearbox or be tilted according to the axis of the filler opening. One advantage of this design is the significantly increased resistance to deformation of the securing element under extreme loads.

The ring gear or circular spline is preferably made from steel or cast materials.

In a first preferred design, the tension shaft gearbox is designed as a flat gearbox. In a second preferred design, the tension shaft gearbox is designed as a pto gearbox.

The advantages of the invention lie in particular in the fact that the integration of a securing element for the rolling elements with the circular spline provides a particularly reliable and robust design of a gearbox. Since no separate component is required for the axial limitation of the rolling elements, the assembly of the gearbox is simplified. In addition, the securing element is fixed via the screw connection of the circular spline.

Further objectives, advantages, features, and applications of the present invention are derived from the subsequent description of an exemplary embodiment by way of the drawings. All described and/or depicted features, per se or in any combination, constitute the subject-matter of the present invention, regardless of their summary in the patent claims or their back-reference.

DESCRIPTION OF THE DRAWINGS

The following are shown schematically.

In all figures, the same parts are labeled with the same reference symbols.

DETAILED DESCRIPTION

Figure 1:
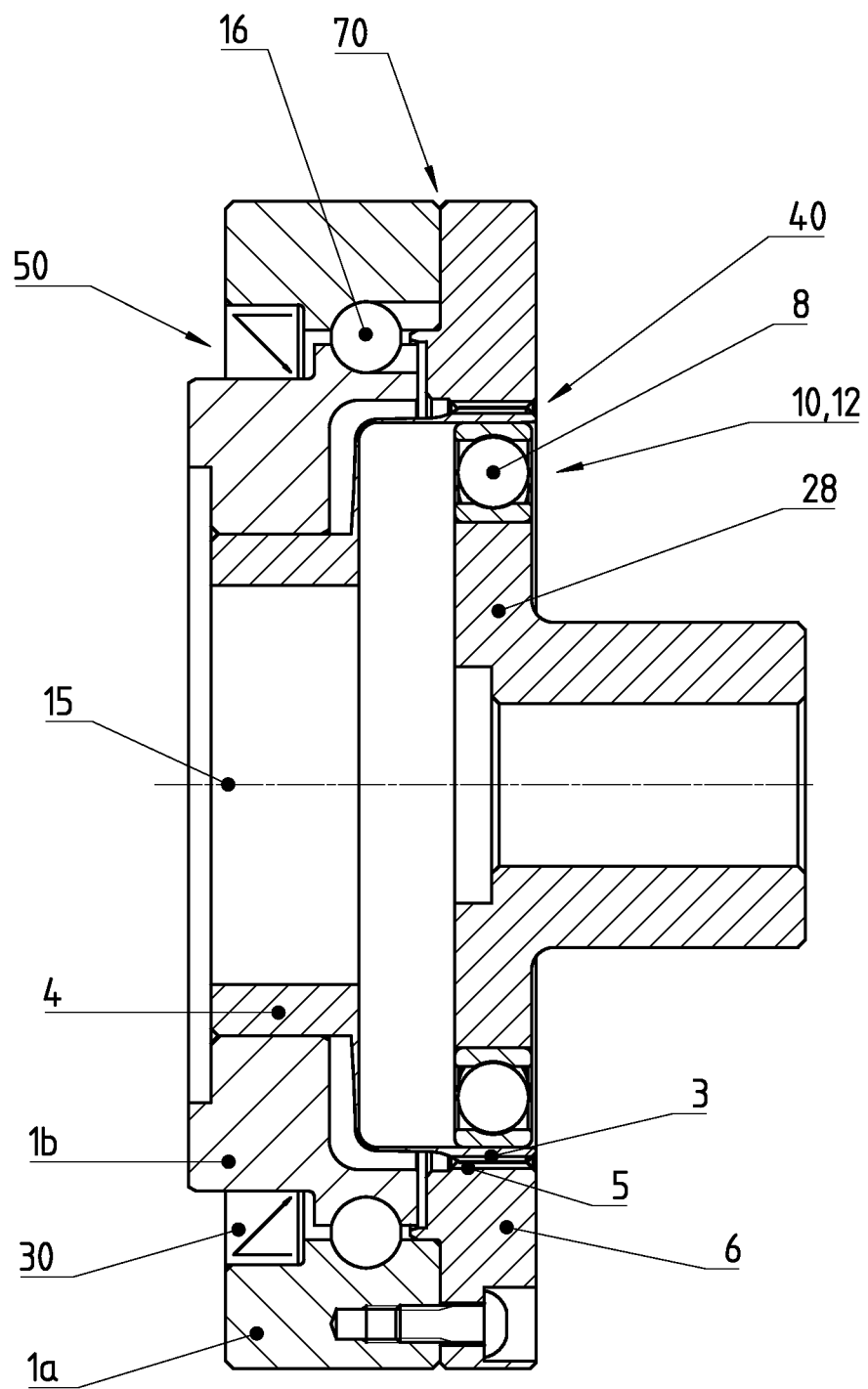
FIG. 1 shows the front view of a pivot bearing with a pto gearbox mounted in it in a preferred embodiment in longitudinal section, FIG. 2 an enlarged section of FIG. 1, FIG. 3 the front view of a pivot bearing with a flat gearbox in longitudinal section, FIG. 4 an enlarged section of FIG. 3, FIG. 5 a perspective view of a circular spline in a preferred embodiment, FIG. 6 the circular spline according to FIG. 5 in a side view from the left, FIG. 7 the longitudinal section of FIG. 6, FIG. 8 a circular spline in a further preferred embodiment in a perspective view, FIG. 9 the circular spline as shown in FIG. 8 in a side view from the left, and FIG. 10 the longitudinal section of FIG. 9.

FIG. 1 shows an exemplary embodiment of a pivot bearing 50 according to the invention and a tension shaft gearbox 40 mounted therein, which together form a gearbox 70, in mounted condition in longitudinal section.

Figure 2:
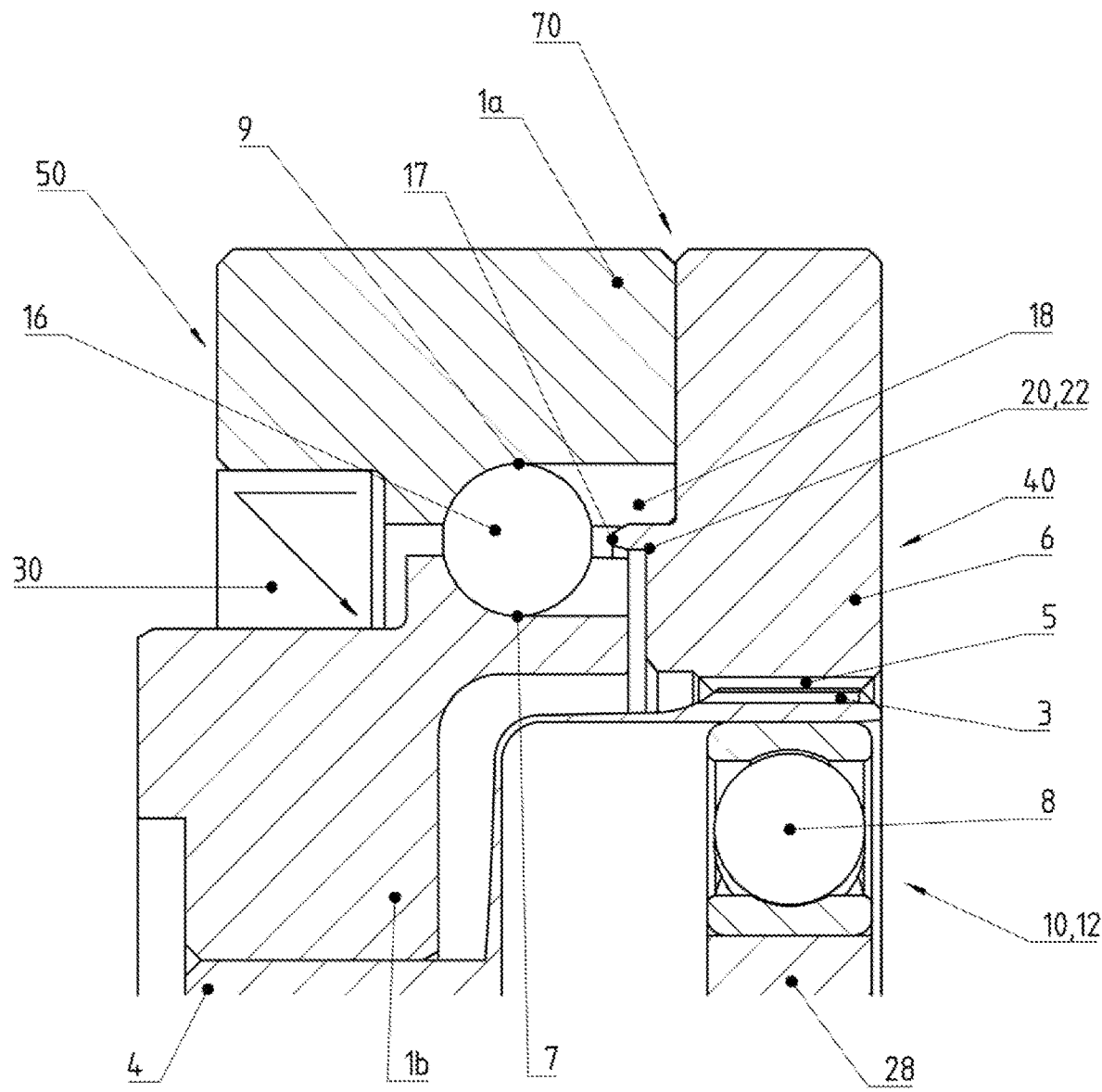

The pivot bearing 50 has an outer pivot bearing ring 1a with a pivot bearing surface 9 or running track (see FIG. 2) and an inner pivot bearing ring 1b arranged radially inwards and coaxially thereto with a pivot bearing surface 7 or running track, as well as the rolling elements 16. The running tracks of both pivot bearing rings 1a, 1b are interrupted at one point on the circumference by a filler opening 18, through which the rolling elements 16 are filled into the pivot bearing 50. The running tracks are designed in a preferred version as in a four-point bearing. In the example shown, the rolling elements 16 are designed as balls and enable low-friction rotation of the pivot bearing rings 1a and 1b and at the same time prevent tilting and displacement of the components of the tension shaft gearbox 40. The radial shaft seal ring 30 shown in FIG. 1 is a radially acting seal that prevents lubricant from escaping from the pivot bearing. This seal also prevents foreign matter from entering the pivot bearing.

The tension shaft gearbox 40 is designed as a pto gearbox and has an elliptical wave generator 10, a flexspline 4 with external gearing 3 and a circular spline 6 with internal gearing 5.

In the exemplary embodiment selected here, the wave generator 10 is formed by a centric hub, the so-called plug 28, and with a ball bearing, the so-called wave generator bearing 12. The plug 28 has an elliptical cross-section on its outer side. The wave generator bearing 12 is mounted on this lateral surface with the elliptical cross-section. It is designed to withstand deformation in the elliptical cross-section.

The components of the tension shaft gearbox 40 are arranged coaxially.

The flexspline 4 is also deformed elliptically by the wave generator 10. The elliptically deformed flexspline 4 engages with its external gearing 3 in the opposite areas of the large elliptical axis in an internal gearing 5 of the circular spline 6.

The outer gearing 3 of the flexspline 4 is only in mesh with the inner gearing 5 of the circular spline 6 in the area of the large elliptical axis. By rotating the wave generator 10, the elliptical deformation shifts along the circumference of the flexspline 4 and a rotational relative movement occurs between flexspline 4 and circular spline 6, wherein a high reduction ratio is realized in just one gear stage.

In the exemplary embodiment selected here, the flexspline 4 has two fewer teeth than the circular spline 6, so that during a half revolution of the wave generator 10 there is a relative rotation between flexspline 4 and circular spline 6 by the angle of one tooth pitch and during a full revolution by two tooth pitches.

The components of the pivot bearing 50 and the tension shaft gearbox 40, namely the inner pivot bearing ring 1a, the outer pivot bearing ring 1b, the wave generator 2, the flexspline 4, and the circular spline 6, are arranged coaxially around a common central longitudinal axis 15. The flexspline 4 is connected to the inner pivot bearing ring 1b. The circular spline 6 is connected to the outer pivot bearing ring 1a.

The gearbox 70 and thus the pivot bearing 50 is optimized for high reliability and a long service life. In order to prevent the rolling elements 16 from falling out of the filling groove 18, the circular spline 6 has a securing element 20 or is integrally formed with it, which in the present preferred exemplary embodiment is formed as an axial collar 22, see FIG. 2. This means that the securing element 20 extends in an axial direction, i.e., in the direction of the central longitudinal axis 15, into the filling groove 18. The axial collar 22 has a contact surface 17 for the rolling elements 16 that is perpendicular to a central longitudinal axis 15 of the tension shaft gearbox 40. Furthermore, the axial collar 22 has a constant thickness in the radial direction, i.e., in a direction perpendicular to the central longitudinal axis 15. It runs completely in the circumferential direction of the wheel 6, i.e., 360°.

The fact that the securing element 20 is integral with the circular spline 6 or is integrated with it means that a separate guide ring as an additional component can be dispensed with, which simplifies the assembly of the gearbox 70.

Figure 3:
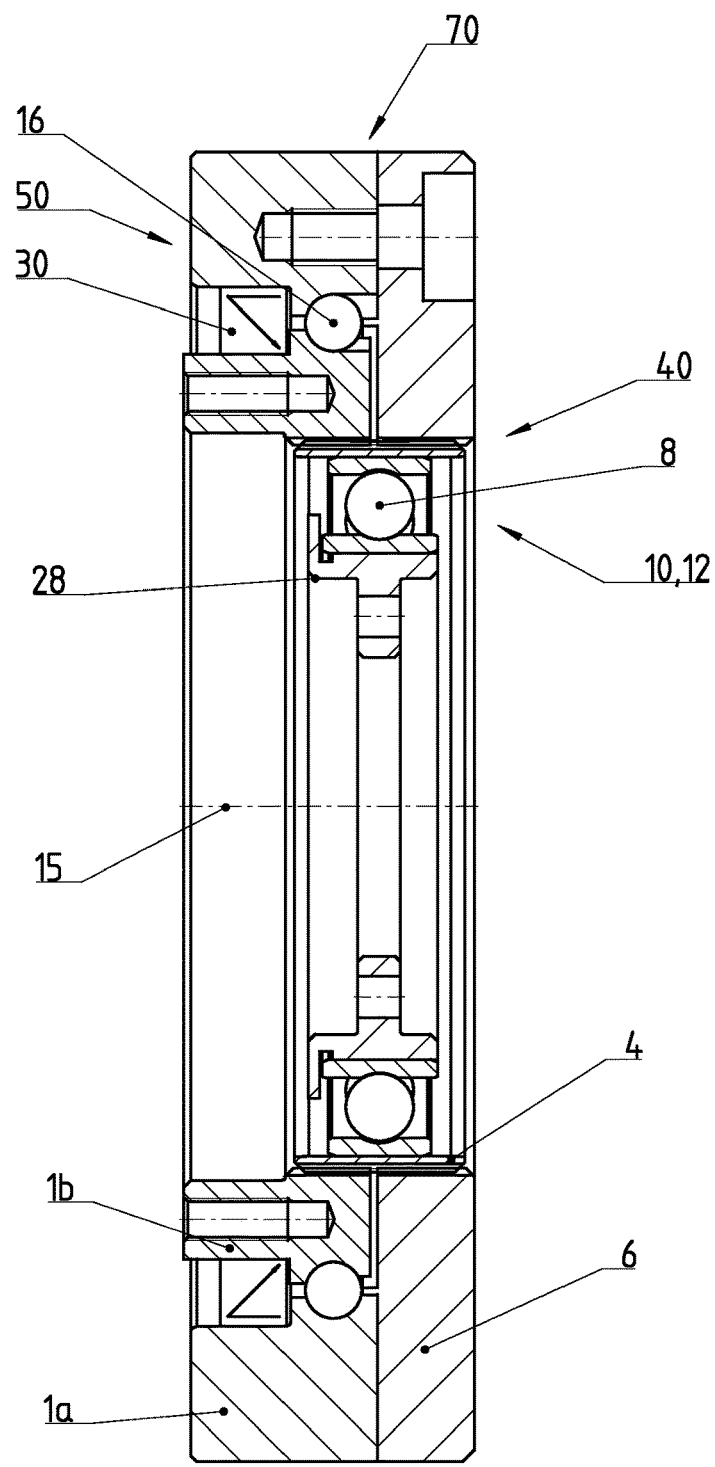
Figure 4:
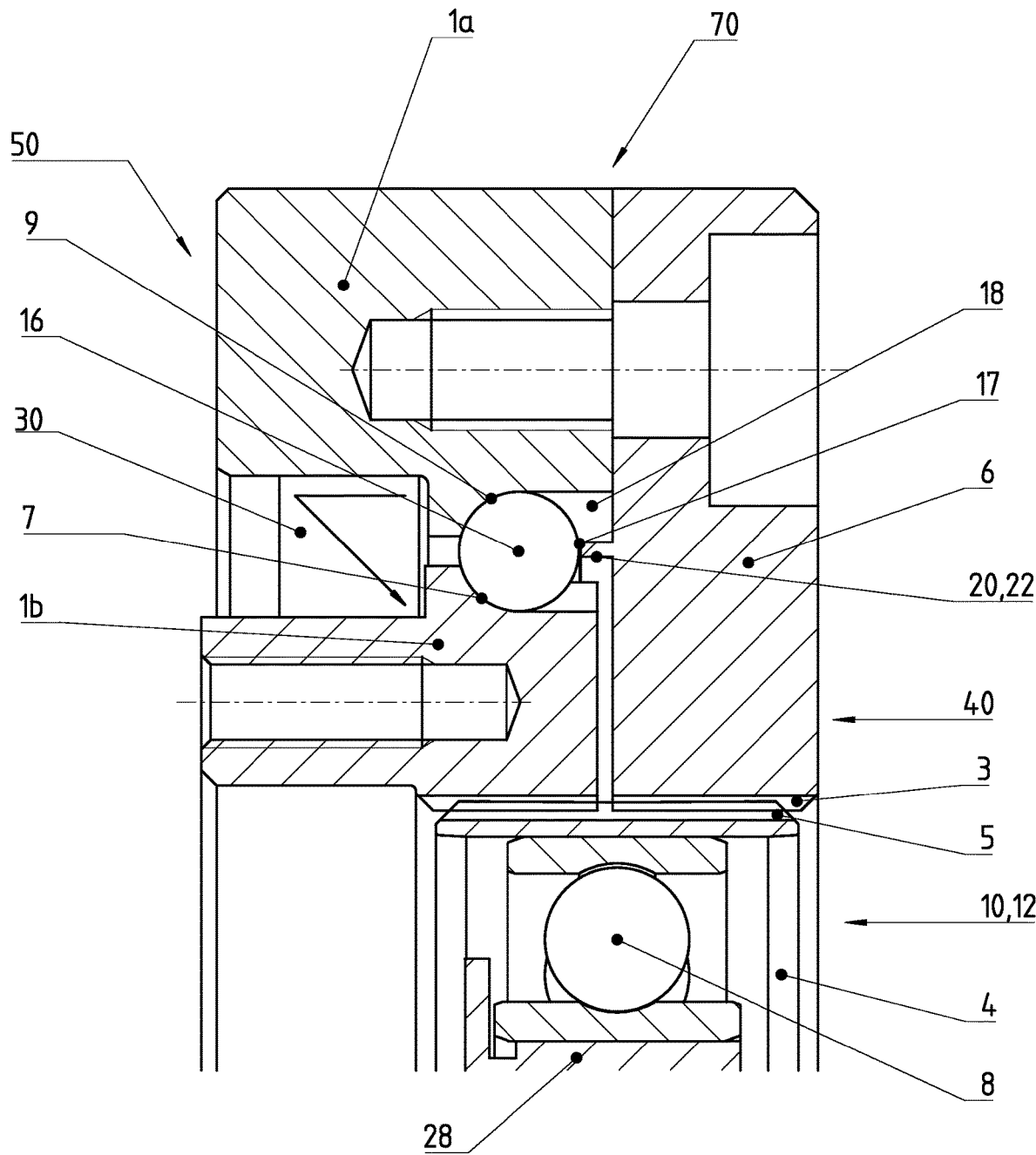

FIGS. 3 and 4 show a pivot bearing 50 with a tension shaft gearbox 40 in a further preferred embodiment. The tension shaft gearbox 40 is designed as a flat gearbox. The circular spline 6 of this tension shaft gearbox 40 also has a securing element 20, which is designed as a collar 22 and has a contact surface 17 for the rolling elements 16, which is aligned perpendicular to the central longitudinal axis 15 of the tension shaft gearbox 40.

Figure 5:
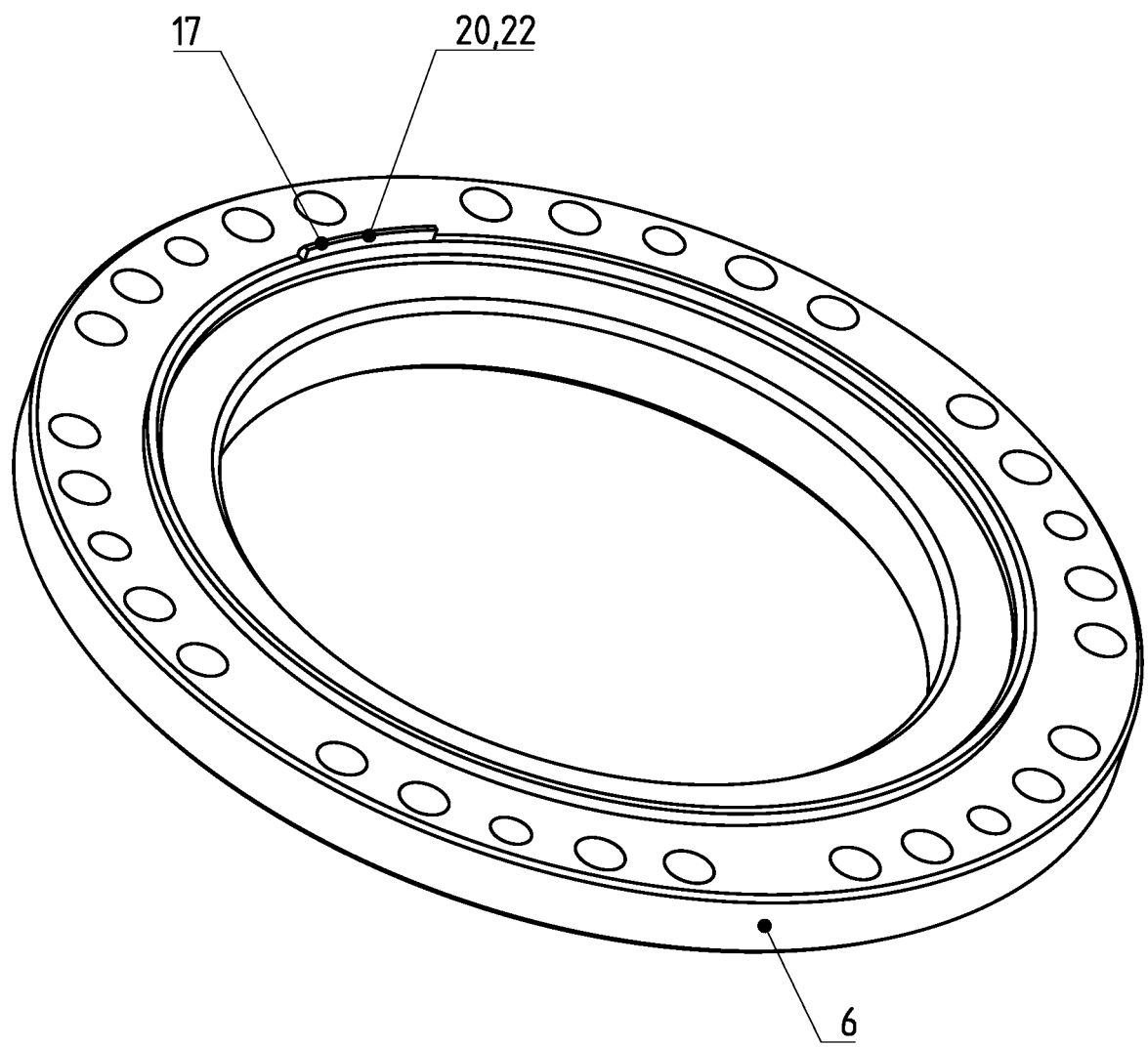
Figure 6:
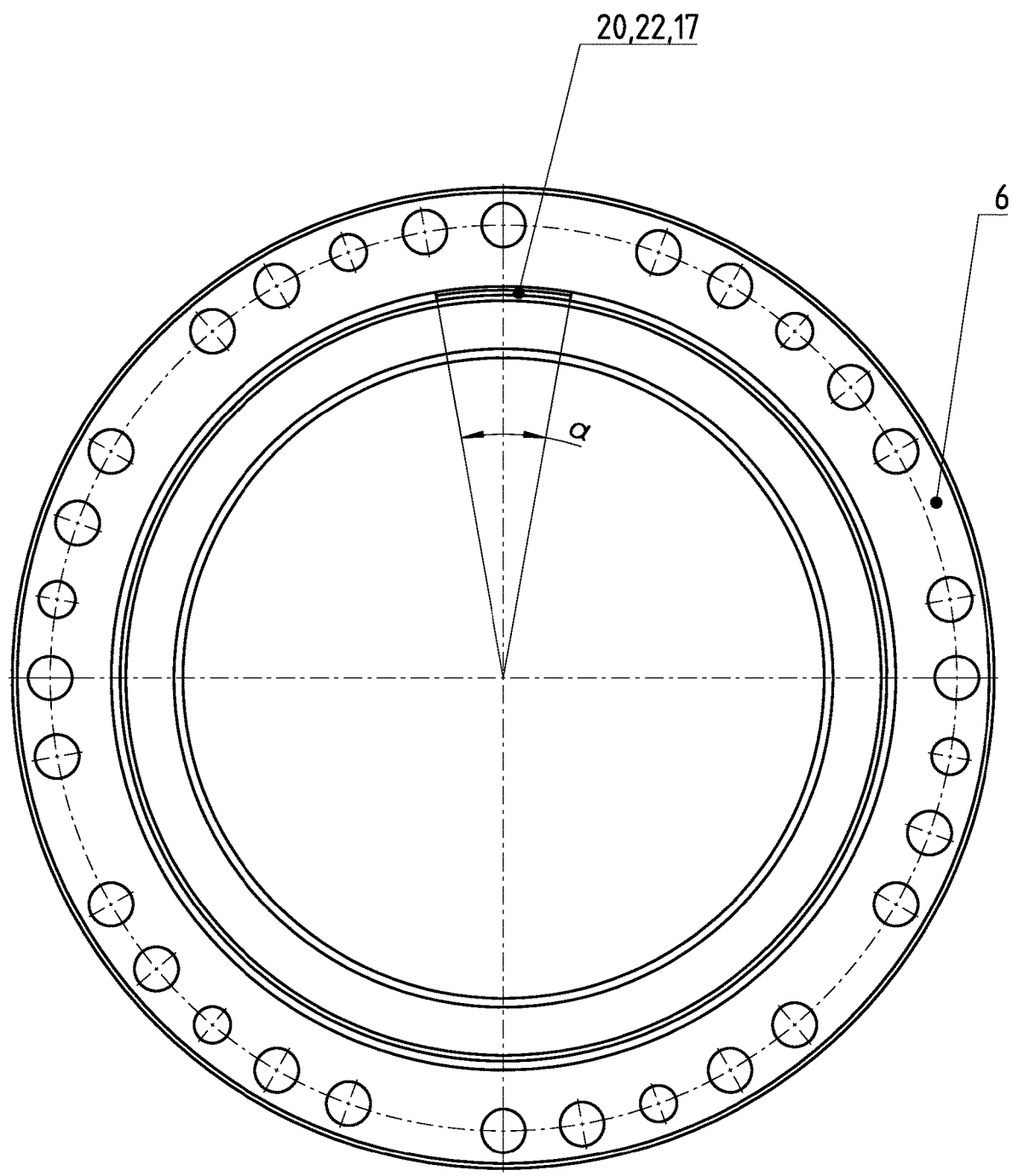
Figure 7:
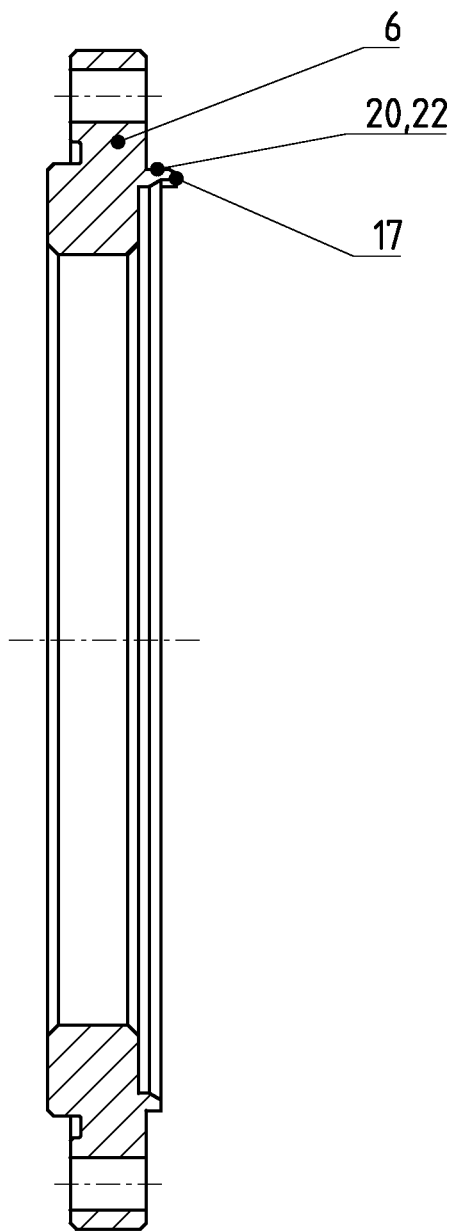

FIG. 5 shows a perspective view of a circular spline 6 for a tension shaft gearbox 40 in a preferred embodiment. The circular spline 6 according to FIG. 5 is shown in a side view in FIG. 6, wherein its longitudinal section is shown in FIG. 7.

The circular spline 6 has a securing element 20, which is designed as a collar 22. In contrast to the collar 22 of the design shown in FIGS. 1 and 2, the collar does not extend completely around the circumference of the circular spline 6. The collar 22 advantageously sweeps over an angle α (see FIG. 6) that is as large or slightly larger than the filler opening for the rolling elements 16. In this exemplary embodiment, the angle is 10°. The axial collar 22 has a contact surface 17 for the rolling elements 16 that is perpendicular to a central longitudinal axis 15 of the tension shaft gearbox 40.

Figure 8:
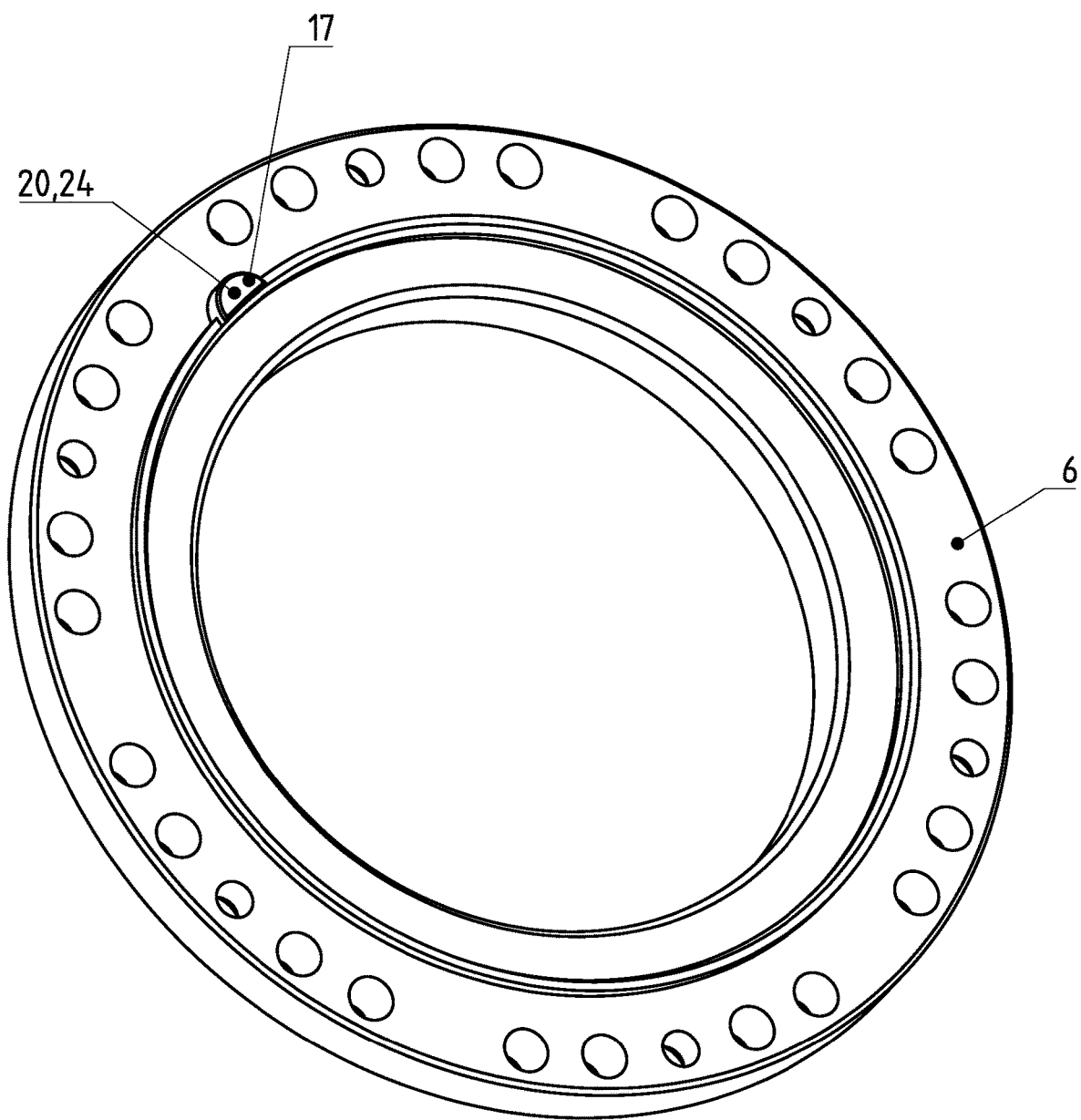
Figure 9:
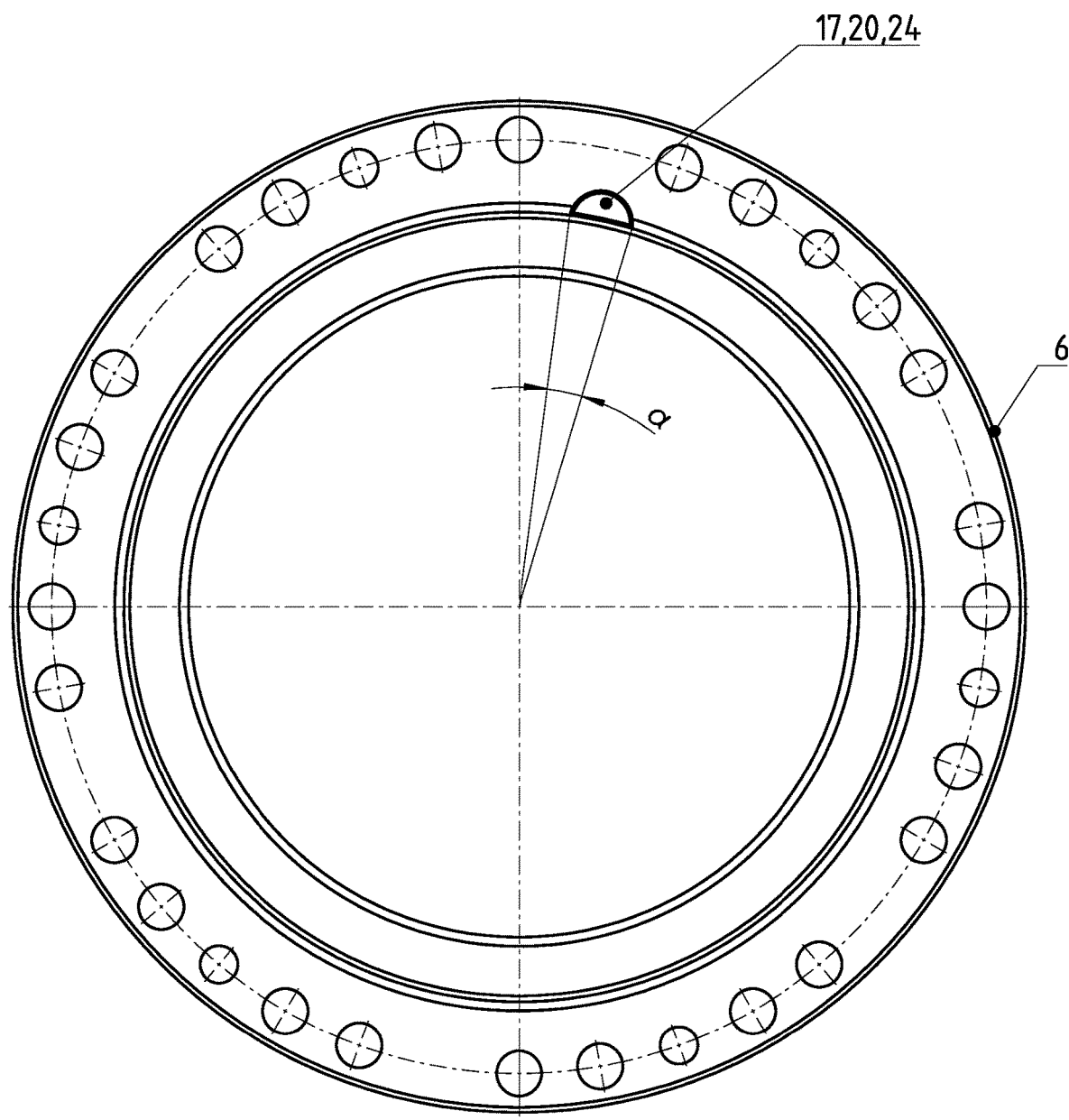
Figure 10:
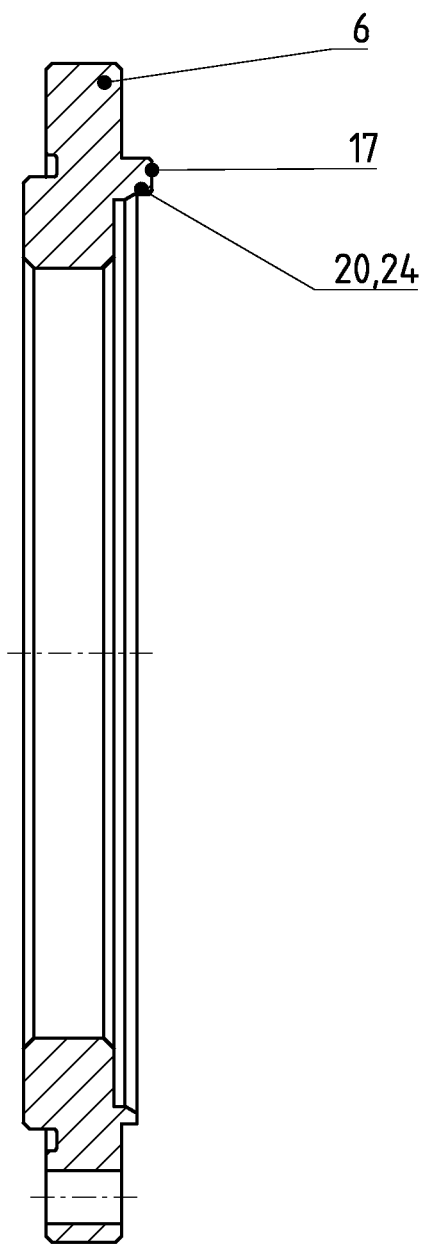

FIG. 8 shows a perspective view of a circular spline 6 for a tension shaft gearbox 40 in a further preferred embodiment. The circular spline 6 according to FIG. 8 is shown in a side view in FIG. 9, wherein its longitudinal section is shown in FIG. 10. The circular spline 6 has a securing element 20, which in this embodiment is designed as an axial projection 24. In contrast to the collar 22 of the design shown in FIGS. 1-4, the axial projection 24 does not extend completely around the circumference of the circular spline 6. In a further preferred embodiment, the securing element is designed as an axial projection whose cross-sectional area is formed by two circular arcs. The inner arc has a larger radius and its center lies on the component axis. The center of the outer arc with the smaller radius lies on or near the inner arc, i.e., the projection has a larger contact surface for the rolling elements 16.

The axial projection 24 (see FIG. 9) is slightly smaller than the filler opening for the rolling elements 16. In the design shown, the axial projection 24 has a contact surface 17 for the rolling elements 16 that is perpendicular to a central longitudinal axis 15 of the tension shaft gearbox 40. The advantage of this design is the increased resistance to escaping balls.

In all of the circular splines 6 shown in FIGS. 1-10, the securing elements 20 are each manufactured in one piece with the circular spline 6. The circular spline 6 is preferably made of cast iron or steel materials.

LIST OF REFERENCE NUMERALS

1a Outer pivot bearing ring
1b Inner pivot bearing ring
3 External gearing
4 Flexspline
5 Internal gearing
6 Circular spline
7 Pivot bearing surface on the inner pivot bearing ring
8 Rolling element
9 Pivot bearing surface on the outer pivot bearing ring
10 Wave generator
12 Wave generator bearing
15 Central longitudinal axis
16 Rolling element
17 Contact surface
18 Filling groove
20 Securing element
22 Axial collar
24 Projection
28 Plug
30 Radial shaft seal ring
40 Tension shaft gearbox
50 Pivot bearing
70 Gearbox
α Angle

The invention claimed is:

1. A gearbox (70) comprising:
a pivot bearing (50) having an outer pivot bearing ring (1a) and an inner pivot bearing ring (1b) arranged therein, wherein a filling groove (18) for rolling elements (16) is formed between the outer and inner pivot bearing rings,
a tension shaft gearbox (40) with a central longitudinal axis (15), which is mounted in the pivot bearing (50) and has a drive component (2),
an elastic flexspline (4) provided with an external gearing (3), and a circular spline (6) aligned about the central longitudinal axis (15) and provided with an internal gearing (5), wherein the flexspline (4) is configured to be plugged onto a wave generator (10) and elliptically deformed by the wave generator (10) in such a way that the external gearing (3) of the flexspline (4) can be brought into engagement with the internal gearing (5) of the circular spline (6) in opposite regions of a large elliptical axis, and
a securing element (20) formed as one piece with the circular spline (6) wherein the circular spline (6) has a circumference, wherein the securing element (20) extends from the circular spline (6) in an axial direction and sweeps over a finite angle (α) of the circumference, said finite angle (α) being less than 360° and corresponding to and larger than the filling groove (18) opening for receiving the rolling elements (16), and wherein the securing element (20) is configured to block axial movement of the rolling elements (16).

2. The gearbox (70) according to claim 1, wherein the securing element (20) has a contact surface (17) for the rolling elements (16) that is perpendicular to the central longitudinal axis (15) of the tension shaft gearbox (40).

3. The gearbox (70) according to claim 1, wherein the securing element (20) has an expansion in a direction perpendicular to the central longitudinal axis (15) of the tension shaft gearbox (40) which is between 4% and 10% of the radius of the rolling elements (16).

4. The gearbox (70) according to claim 1, wherein the securing element (20) restricts axial movement of the rolling elements (16) to less than 10% of the radius of the rolling elements (16).

5. The gearbox (70) according to claim 1, wherein the securing element (20) is designed as a flat axial projection (24), the cross-sectional area of which is formed by two circular arcs comprising an inner arc and an outer arc, wherein the inner arc has a larger radius with the inner arc center lying on the central longitudinal axis (15) and the outer arc has a smaller radius with the outer arc center lying on or near the inner arc.

6. The gearbox (70) according to claim 1, wherein the circular spline (6) and securing element are together made of steel or of cast materials.

7. The gearbox (70) according to claim 1, wherein the tension shaft gearbox (40) is designed as a flat gearbox.

8. The gearbox (70) according to claim 1, wherein the circular spline (6) has an axial collar (22) that is formed rotationally symmetrical around the full circumference of the circular spline (6).

9. The gearbox (70) according to claim 8, wherein the securing element (20) projects axially outwardly from the axial collar (22).

10. The gearbox (70) according to claim 5, wherein the circular spline (6) has an axial collar (22) that is formed rotationally symmetrical around the full circumference of the circular spline, and wherein the securing element (20) projects axially outwardly from the axial collar (22).

11. The gearbox (70) according to claim 5, wherein the circular spline (6) has an axial collar (22) that is formed rotationally symmetrical around the full circumference of the circular spline, and wherein the securing element (20) projects both radially outwardly from the axial collar (22) and axially outwardly from the axial collar (22).

\* \* \* \* \*